US008693808B2

(12) United States Patent
Zahorsky

(10) Patent No.: US 8,693,808 B2
(45) Date of Patent: Apr. 8, 2014

(54) PROVIDING A DIGITAL COPY OF A SOURCE IMAGE

(75) Inventor: Karl-Heinz Zahorsky, Kiel (DE)

(73) Assignee: LaserSoft Imaging AG, Kiel (DE)

( * ) Notice: Subject to any disclaimer, the term of this patent is extended or adjusted under 35 U.S.C. 154(b) by 1226 days.

(21) Appl. No.: 11/988,641

(22) PCT Filed: Jun. 9, 2006

(86) PCT No.: PCT/EP2006/005517
§ 371 (c)(1),
(2), (4) Date: Dec. 8, 2008

(87) PCT Pub. No.: WO2007/006379
PCT Pub. Date: Jan. 18, 2007

(65) Prior Publication Data
US 2009/0180709 A1     Jul. 16, 2009

(30) Foreign Application Priority Data

Jul. 13, 2005   (EP) .................................... 05015193

(51) Int. Cl.
*G06K 9/32*   (2006.01)
*G01B 9/02*   (2006.01)
*G06K 15/00*  (2006.01)

(52) U.S. Cl.
USPC ............................ 382/294; 250/557; 358/488

(58) Field of Classification Search
CPC ............................................ G06T 2207/20216
See application file for complete search history.

(56) References Cited

U.S. PATENT DOCUMENTS 5,251,271 A * 10/1993 Fling ............................. 382/162
6,201,899 B1   3/2001  Bergen
6,728,424 B1 *  4/2004 Zhu et al. ....................... 382/294
2003/0063814 A1  4/2003 Herley
2003/0113031 A1 *  6/2003 Wal ................................. 382/260
2004/0101208 A1  5/2004 Hopkins et al.
2004/0170340 A1  9/2004 Tipping et al.
(Continued)

FOREIGN PATENT DOCUMENTS

DE          10305221 A1      8/2004

OTHER PUBLICATIONS

Fety et al."Amelioration d'images par egalisation de capteurs" Colloque sur le Traitement du Signal et des Images. Juan Les Pins Sep. 16-20, 1991, Nice, Gretsi, FR, vol. 2 Colloque 13, Sep. 16, 1991 pp. 965-968, XP000242938.

(Continued)

*Primary Examiner* — Randolph I Chu
(74) *Attorney, Agent, or Firm* — Kilpatrick Townsend & Stockton LLP; Kenneth R. Allen

(57) ABSTRACT

The present invention relates to a method for an automatic alignment of digital image layers, implemented in specific software on a computing device (e.g. a personal computer (1)) which drives an image scanner (3) and aligns the multiple scanned image layers (25) in such a way, that of these layers (25) one resulting image (10) will be created, which has—by a statistical calculus based on multiple sampling and averaging of these multiple scanned image layers (25)—a decreased random distributed noise spectrum compared to single scanned images (25) and by the automatic alignment avoids a decrease in sharpness using statistical comparison of the multiple layers (25), especially deviation and cost functions, aiming to compensate a misalignment (6), e.g. mechanical mismatches of the scanner's (3) scanning carriage, between multiple scans (25).

11 Claims, 4 Drawing Sheets

(56) References Cited

U.S. PATENT DOCUMENTS

| | | | |
|---|---|---|---|
| 2005/0225808 A1* | 10/2005 | Braudaway et al. | 358/3.26 |
| 2005/0265453 A1* | 12/2005 | Saito | 375/240.16 |
| 2006/0171687 A1* | 8/2006 | Aiso | 386/120 |
| 2006/0215932 A1* | 9/2006 | Castorina et al. | 382/284 |
| 2008/0019611 A1* | 1/2008 | Larkin et al. | 382/287 |
| 2008/0232715 A1* | 9/2008 | Miyakawa et al. | 382/284 |
| 2009/0245692 A1* | 10/2009 | Okutomi et al. | 382/294 |

OTHER PUBLICATIONS

Stern et al., "Restoration and Resolution Enhancement of Single Image From a Vibration-Distorted Image Sequence," Sep. 2000, Opt. Eng. 39(9) 2451-2457.

* cited by examiner

PROVIDING A DIGITAL COPY OF A SOURCE IMAGE

CROSS-REFERENCE TO RELATED APPLICATIONS

This application is a National Stage of International Application No. PCT/EP2006/005517, filed Jun. 9, 2006, and which claims the benefit of European Patent Application No. 05015193.5, filed Jul. 13, 2005, the disclosures of both applications being incorporated herein by reference.

BACKGROUND OF THE INVENTION

The present invention relates to providing a digital copy of a source image for enhancing the quality of the sampled digital copy.

The ability to scan multiple images—from the same source image to avoid random distributed noise, which is caused by thermal or amplification noise of the scanner's sensors (CCDs, charged coupled devices) and signal amplifiers—is a great feature of prior art scan software to enhance image quality of the final digital copy, especially when using elder or low cost scanners. The multiple sampling of the source image is based on the calculus that random distributed noise is statistical averaged out by averaging multiple sampled or scanned images.

DE 10305221A1 discloses a method to suppress noise in at least two digital pictures which were created by X-ray. At least two digital pictures are used to create a digital picture with reduced noise. The at least two digital pictures are similar to each other. These similar pictures are optimized by creating an averaged sample. US 2004/0170340A1 discloses an image super resolution system which computes a high resolution image of a target for multiple low resolution images of the same target. Each low resolution image differs slightly and perspective from each of the other low resolution images. Marginal likelihood of the low resolution images is optimized to determine the improved estimates of the registration perimeters and the acuity perimeter, which are used to solve for the higher resolution image. US 2004/0101208A1 discloses an apparatus and a method for averaging image signals in a media processor to improve a signal to noise ratio of a signal in a film digitizer or in a scanner. Féty et al."Amélioration d'images par égalisation de capteurs" Colloque sur le Traitement du Signal et des Images. Juan Les Pins Sep. 16-20, 1991, Nice, GRETSI, FR, vol. 2 Colloque 13, 16 Sep. 1991 pages 965-968, XP000242938 discloses a method to treat digital copies of an original sample by modeling errors of the scanning medium and by using the error modeling to eliminate respective errors.

SUMMARY OF THE INVENTION

It is an object of the invention to provide an improved digital copy of a source image, in particular to provide an improved digital copy of a source image when using multiple sampling of the source image to average out random distributed noise.

The object of the invention is solved by the independent claims.

The present invention comprises the perception that during the above-described prior art multiple scanning process it is likely that there are problems occurring in this process. These problems were identified as being mechanical problems. Between multiple scans the start and end point of the scanning carriage can be mismatched, even the horizontal alignment may differ. The result of multiple scans then will be a final image that consists of accumulated multiple images in which image details are misaligned with respect to each other and may have an offset of up to 20 pixels in any direction towards each other. The resulting or final image then has less random distributed noise, but has a huge loss in sharpness caused by the afore mentioned misalignment.

One major advantage of embodiments of the present invention, e.g. according to claim 1, is the possibility of an automatic pixelwise alignment of multiple digital scanned image-layers to improve image quality concerning image noise and simultaneously to improve image sharpness, when using a scanner, a computing device, and/or a driver—and scan software. Therefore, embodiments of the present invention, e.g. according to claim 1, solve the above illustrated technical problems of the prior art multiple scanning by an automatic software based alignment of multiple images.

Therefore, embodiments of the present invention, e.g. according to claim 1, solve the prior art problem of a misalignment between multiple scanned images. By these preferred embodiments of the present invention multiple accumulated scans of the same source images result in an output image that has less random distributed noise, but in the best case no loss in sharpness.

Other advantages of embodiments of the present invention, e.g. according to claim 1, are:

By the application of a comparison of environments or surroundings of defined pixel positions between multiple sample images of the same source image according to an embodiment of the present invention, e.g. according to claim 1, it is possible to get offsets between these images and then to eliminate those offsets by shifting the misaligned samples by the pixels of those offsets when overlaying the multiple samples;

By using an automatic alignment of the sample images according to an embodiment of the present invention, e.g. according to claim 1, an enhancement in sharpness of the final digitally copied image, which is accumulated in multiple scans of the same image source, is achieved.

According to an embodiment of the present invention, e.g. according to claim 1, the use of an automatic alignment of images is possible in combination with a multiple image scanning process to avoid random distributed noise but also to obtain enhanced sharpness of the final digital copy.

According to a preferred embodiment of the present invention the mathematical methods used for the statistical comparison are statistical properties of images. Preferably, the statistical comparison is performed by using a cost function.

According to another preferred embodiment of the present invention, the automatic alignment process analyses a, preferably first, scanned image for a region, a so called reference area or reference block of specific size of high contrast, i.e., details in the image, to get an appropriate comparison area or block which is used as reference area or reference block between multiple images. In an environment of +/− a maximum expected pixel-offset of the pixel position of this reference block, a corresponding or matching block is present in the other images.

To gain the exact offset pixels of this corresponding block, which is misaligned in the other sampled images, preferably the value of the cost function between the referring block and each possible matching block, which is deviant with respect to the pixel position of the reference block from 0 up to the predefined maximum expected offset pixels, is calculated. The corresponding block in the other sampled images is in all probability at an offset position where the value of the cost function is zero or least.

A preferred embodiment comprises the steps of performing the statistical comparison by defining a reference area, preferably a square, in, preferably the first, one of the samples, allocating a reference pixel position on the sample to the reference area, locating a similar area, preferably also a square, having substantially, preferably exactly, the same size within a predetermined surrounding of a respective pixel position in at least one other sample, which respective pixel position corresponds to the reference pixel position, allocating a pixel position on the at least one other sample to the similar area, comparing the pixel position of the reference area with the allocated pixel position of the similar area for detecting the misalignment between the reference area and the similar area. The surrounding can be predetermined by defining at least one maximum of expected offset pixels around the reference pixel position.

Another preferred embodiment comprises the steps of defining a reference area by evaluating a variance for at least two areas of specific size in, preferably the first, one of the samples, determining the maximum of all evaluated variances, choosing an area showing the maximum variance as the reference area.

A further preferred embodiment comprises the steps of defining a reference area by choosing an area which shows a variance greater than a specific threshold, which is preferably a noise level in the sample.

According to a preferred embodiment of the present invention the method comprises the steps of allocating the pixel position of the center of the reference area as the allocated reference pixel position, and/or allocating the pixel position of the center of the similar area as the allocated pixel position of the similar area.

The compensating of the detected misalignment can be done by aligning the at least one, preferably each, other sample with the sample comprising the reference area, preferably by shifting the at least one, preferably each, other sample by the pixel offset, preferably in X- and in Y-direction, between the reference pixel position of the reference area and of the pixel position of the similar area in the at least one other sample when averaging or overlaying the multiple samples.

Other preferred embodiments are shown by the dependent claims.

The invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF A PREFERRED EMBODIMENT OF THE INVENTION

Figure 1:
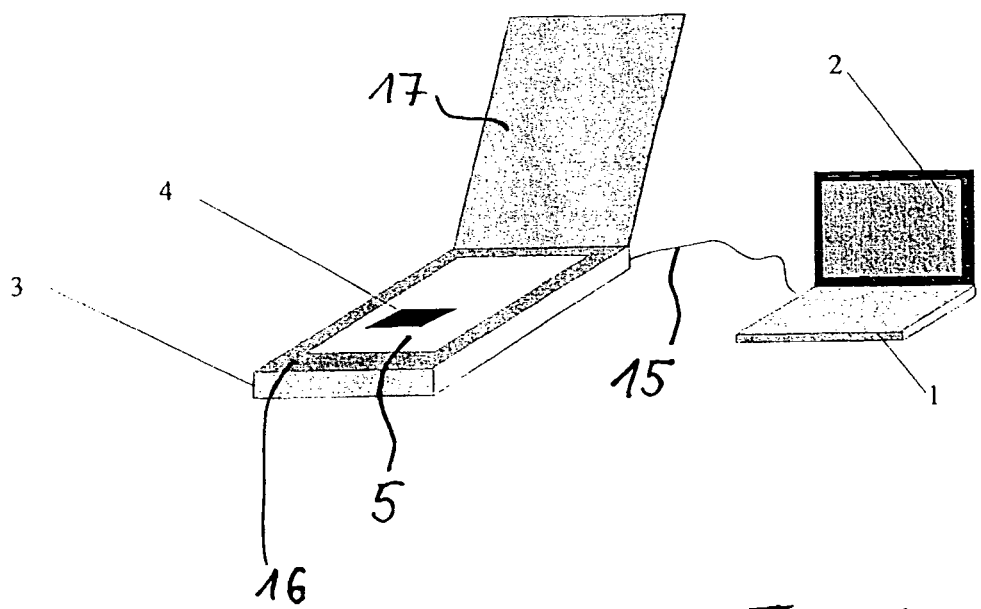
FIG. 1-4 show schematic illustrations of an embodiment of the present invention.

Referring now in greater detail to the drawings, FIG. 1 shows an embodiment of an inventive process performed by a computing device 1 using a scan software 2 and a scanner 3. The computing device 1 can be any personal computer or laptop or notebook as known in the prior art. In FIG. 1 the computing device 1 is a laptop. Laptop 1 loads the scan software 2 from a CD-ROM or any other storage device into its (not shown) main memory and runs the scan software 2 by its central processing unit, also not shown. Laptop 1 is connected to scanner 3 by a connecting wire 15. However, laptop 1 can also be connected by non-mechanical means, e.g. by a bluetooth or infrared connection, to scanner 3.

Figure 2:
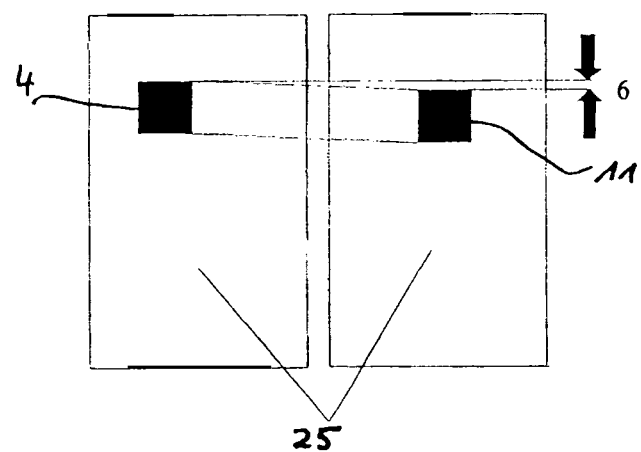
Figure 3:
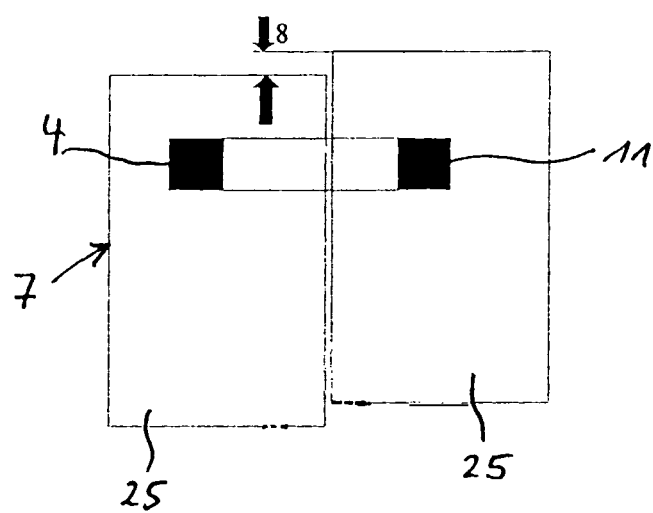
Figure 4:
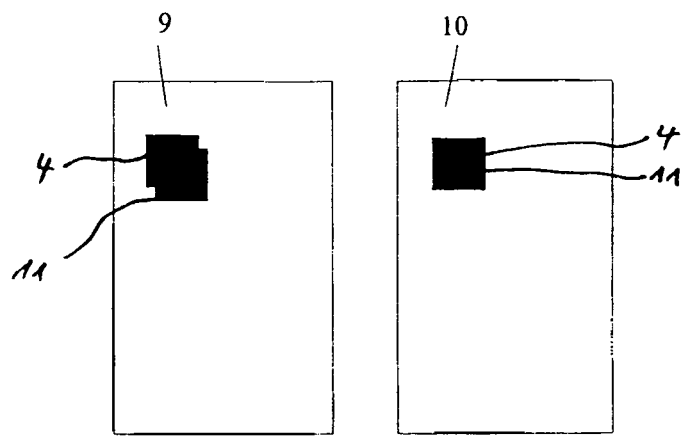

Scanner 3 has a scanning area 16. On scanning area 16 there is positioned an image 5 which is to be scanned by scanner 3. Image 5 has a high variance environment, a so called block 4 of specific size. For scanning the image 5 on the scanning surface 16 of scanner 3 a cover 17 of scanner 3 is closed and the scanning process is activated by running scan software 2 on laptop 1. Scan software 2 takes n user defined scans 25 of the same source image 5 with scanner 3 automatically. For each scan 25 an automatic alignment of the scanned images 25 is applied with a detected offset 6 (see FIG. 2) to shift the scanned images 25 to a position 7 shifted by a distance 8 (see FIG. 3) to avoid a misaligned output image 9 (see FIG. 4) and to create a corrected output image 10 (see FIG. 4) instead. The alignment process can be subdivided into the following main steps:

Step 1: Seeking a high variance environment, the so called block 4 of specific size in the first scan 25 of image 5 as a reference. Every scanned sample 25 of image 5 is then analysed in blocks, the variance of a block is calculated as a square of the standard deviation. As long as the variance is not greater than a predetermined specific threshold of a variance value which is judged as noise and which can be adjusted, an appropriate block is not selected yet, the scanned sample 25 is further analysed, another block shifted by x and/or y pixel is analysed. If a block has a variance greater than the afore mentioned noise threshold this process of analyzing and calculating is stopped. The found block is taken as the reference comparison block 4.

Step 2: The reference comparison block 4 of the first scan 25 of image 5 will be compared iteratively with a same size block 11 also called matching block 11 at the same pixel position in all other scanned samples 25 of image 5. This comparison is in detail a calculation of the value of the cost function between the reference block 4 and the matching block 11, preferably the sum of squared differences (SSD), in pixelwise steps in an environment from 0 (reference position) to +/− the maximum expected offset pixels around the reference block 4. These calculations build a so called cost function. A cost function SSD could be according to the following formula:

$$SSD(lr,lm) = \Sigma_{(i,j)}[(lr(i,j) - lm(i,j))^2]$$

with i, j being all pixels of the respective blocks, Ir being the reference block, and Im being the matching block.

Step 3: The minimum of the cost function is then determined. The x and y offset parameters of an offset 6 (see FIG. 2) for the found minimum are taken to shift the scanned images 25 by distance 8 to a relative position 7 (see FIG. 3) when overlaying the scanned images 25 regarding the defected offset 6. Missing pixels at the borders of the scanned images 25 are either set to zero or cut off. The scanned images 25 are accumulated and create an output image 10 with less random distributed noise without loss in sharpness.

The reference numerals in the drawings are as follows:
1 a computing device
2 a software on the computing device 1
3 a scanner
4 a reference block in source image 5
5 source image
6 an offset between the two misaligned scanned samples 25
7 aligned position of one of the image samples 25
8 an aligning offset to compensate offset 6

9 a not aligned resulting image according to the prior art process
10 an automatically aligned resulting image according to an embodiment of the present invention.
11 matching block
15 connecting wire
16 scanning surface of scanner 3
17 cover of scanner 3
25 scan of image 5

The invention claimed is:

1. A method for providing a digital copy of a source image, comprising the steps of:
    averaging multiple samples of the source image for generating the digital copy,
    the averaging step comprising:
    performing a statistical comparison of at least two of the multiple samples within the source image to detect for misalignment between the multiple samples, and
    compensating for detected misalignment,
    wherein the performing the statistical comparison comprises:
        defining a reference area in a first one of the samples,
        allocating a reference pixel position on the sample to the reference area,
        locating a similar area having the same size as the reference area within a predetermined surrounding of a respective pixel position in at least one other sample, which respective pixel position corresponds to the reference pixel position,
        allocating a pixel position on the at least one other sample to the similar area,
        comparing the pixel position of the reference area with the allocated pixel position of the similar area for detecting the misalignment between the reference area and the similar area,
    wherein the statistical comparison is performed by using a cost function to find minima.

2. The method of claim 1, wherein the cost function SSD is:

$$SSD(Lr,Lm)=\Sigma_{(i,j)}[(Lr(i,j)-(Lm(i,j)]$$

where i and j are all pixels of respective reference block and matching block,
Lr is the reference block, and
Lm is the matching block.

3. The method of claim 1, further comprising the steps of:
defining of the reference area (4) by evaluating a variance for at least two areas of specific size in, preferably the first, one of the samples (25),
determining the maximum of all evaluated variances, and
choosing an area showing the maximum variance as the reference area (4).

4. The method of claim 1, further comprising the steps of:
defining of the reference area (4) by choosing an area which shows a variance greater than a specific threshold.

5. The method of claim 4, further comprising the step of:
choosing as the specific threshold a noise level in the sample (25).

6. The method of claim 1, further comprising the step of:
choosing a square (4) as the reference area (4).

7. The method of claim 1, further comprising the step of:
allocating the pixel position of the center of the reference area (4) as the allocated reference pixel position, and/or allocating the pixel position of the center of the similar area (11) as the allocated pixel position of the similar area (11).

8. The method of claim 1, further comprising the steps of:
predetermining the surrounding by defining at least one maximum of expected offset pixels around the reference pixel position.

9. The method of claim 1, further comprising the steps of:
compensating the detected misalignment (6) by aligning the at least one, preferably each, other sample (25) with the sample (25) comprising the reference area (4).

10. The method of claim 9, further comprising the steps of:
aligning the at least one, preferably each, other sample with the sample (25) comprising the reference area (4) by shifting the at least one, preferably each, other sample (25) by the pixel offset, preferably in X- and in Y-direction, between the reference pixel position of the reference area (4) and of the pixel position of the similar area (11) in the at least one other sample (25) when averaging or overlaying the multiple samples (25).

11. A software program stored on a non-transitory computer-readable storage medium, said program being operative for providing a digital copy of a source image, when run on a data processing system selected from one of a computer, a scanner and a digital camera, said program comprising the steps of:
    averaging multiple samples of the source image for generating the digital copy,
    said multiple samples averaging step comprising:
    performing a statistical comparison of at least two of the multiple samples to detect for misalignment between the multiple samples, and
    compensating for detected misalignment,
    wherein the performing the statistical comparison comprises:
        defining a reference area in a first one of the samples,
        allocating a reference pixel position on the sample to the reference area,
        locating a similar area having the same size as the reference area within a predetermined surrounding of a respective pixel position in at least one other sample, which respective pixel position corresponds to the reference pixel position,
        allocating a pixel position on the at least one other sample to the similar area, and
        comparing the pixel position of the reference area with the allocated pixel position of the similar area for detecting the misalignment between the reference area and the similar area,
    wherein the statistical comparison is performed by using a cost function to find minima.

* * * * *